W. M. JENKINS & E. R. WARD.
TOOL FOR LOCKING NUTS.
APPLICATION FILED JUNE 23, 1911.
1,020,040.
Patented Mar. 12, 1912.
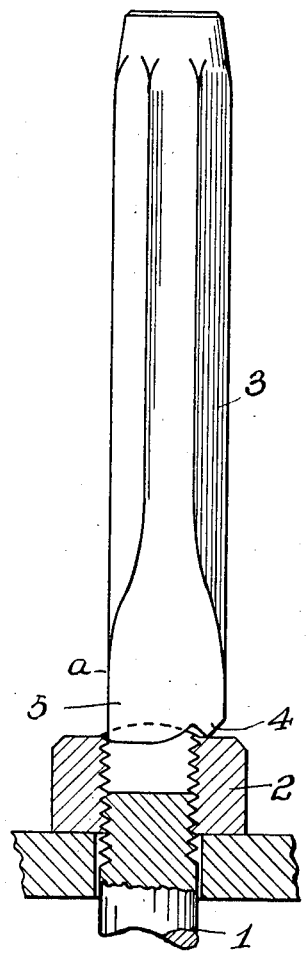
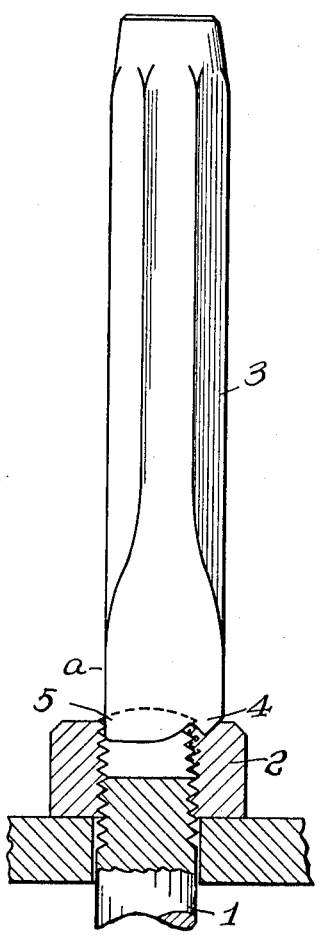
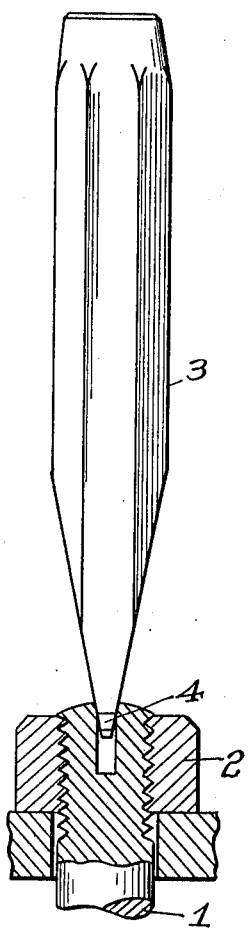

UNITED STATES PATENT OFFICE.

WILLIAM M. JENKINS, OF PITTSBURGH, PENNSYLVANIA, AND EDMUND R. WARD, OF HARTFORD, CONNECTICUT.

TOOL FOR LOCKING NUTS.

1,020,040.  Specification of Letters Patent.  Patented Mar. 12, 1912.

Application filed June 23, 1911. Serial No. 634,976.

*To all whom it may concern:*

Be it known that we, WILLIAM M. JENKINS, residing at Pittsburgh, county of Allegheny and State of Pennsylvania, and EDMUND R. WARD, residing at Hartford, in the county of Hartford and State of Connecticut, citizens of the United States, have invented or discovered certain new and useful Improvements in Tools for Locking Nuts, of which improvements the following is a specification.

The invention described herein has for its object the provision of a tool whereby a portion of a nut may be displaced and forced into engagement with the bolt on which the nut is screwed.

The invention is hereinafter more fully described and claimed.

In the accompanying drawing forming a part of this specification Figure 1 is a view showing the tool in elevation and applied to the nut and bolt which are shown in the section; Fig. 2 is a similar view illustrating the operation of the tool and Fig. 3 is a view at right angles to Figs. 1 and 2.

A most efficient lock for preventing the jarring loose of a nut is formed by forcing a small tongue of metal of the nut into a grooved recess or slot in the bolt. It is preferred to slot the threaded end of the bolt for such a distance relative to the position the nut 2 will occupy that its upper surface will be outside the inner end of the slot as shown in Figs. 1 and 2.

The tool consists of a body portion 3 having at its lower end a spur 4 and a laterally extending wing 5 which will serve to insure the proper placing of the spur both as regards alinement with the slot in the bolt and also as regards the desired amount of metal which is to be displaced and forced into the slot. It is preferred that the lower portion of the tool should be wedge shaped as shown in Fig. 3 the thickness of the edge being a little less than the width of the slot, so that the end of the tool will enter the latter. The transverse length of the tool measuring from the swaging spur 4 will depend upon the internal diameter of the nut. In all cases such length should be equal to such internal diameter plus the distance from the internal periphery of the point at which the spur should engage the nut to insure the displacement of the desired amount of metal.

The wing 5 is made to extend a little beyond the spur so that it may enter the slot in the bolt before the spur bears in the nut, and the edge *a* of the wing opposite the spur is made straight so that it may act as a guide by bearing against the threads of the nut when the wing is inserted in the slot in the bolt. As will be readily understood the sides of the wing when placed in the slot will bear against the side walls of the slot and in that way insure that the spur will bear on top of the nut in line with the slot, and the edge *a* of the wing bearing against the threads, will determine the position of the spur relative to the inner periphery of the nut, so that for given sizes of nut and bolt, a sufficient amount of metal will be displaced by the spur to form an efficient lock.

By reason of carelessness in manufacture or the wear of taps or dies, the nuts will fit loosely on the bolts, and in order to cause the bolts to fit tightly in the nut, it is preferred to make the wing wedge shaped so that when the spur is driven into the nut to form the locking tongue, the bolt itself is spread by the wedging action of the wing and will be held in such condition by the tongue of metal forced in between the spread or opened portions of the bolt.

We are aware that nut locking tools having a middle portion adapted to enter the slot of a bolt, and a spur on each side of such middle are old. But the middle portion of such tools is narrower than the bolt and hence will determine the position of the tool in one plane only. In practice it is found that the workman is frequently careless in placing the tool so that one spur will displace an insufficient amount of metal and the other spur be so far from the inner periphery of the nut that no metal will be displaced, or one spur may be forced between the nut and bolt defacing the threads of both.

We claim herein as our invention

1. A nut locking tool comprising a shank, a spur, and a guide wing extending laterally in the plane of the spur and having a guide edge adapted to bear against the inner periphery of the nut the distance between such edge and the spur being equal to the internal diameter of the nut plus the radial thickness of metal to be displaced.

2. A nut locking tool comprising a shank, a spur and a wedge shaped wing extending laterally in the plane of the spur and having a guide edge adapted to bear against the inner periphery of the nut the distance between such edge and the spur being equal to the internal diameter of the nut plus the radial thickness of metal to be displaced.

In testimony whereof, we have hereunto set our hands.

WILLIAM M. JENKINS.
EDMUND R. WARD.

Witnesses:
W. J. SNODGRASS,
THOMAS JOYCE.

Copies of this patent may be obtained for five cents each, by addressing the "Commissioner of Patents, Washington, D. C."